(12) United States Patent
Carson

(10) Patent No.: US 7,102,973 B1
(45) Date of Patent: Sep. 5, 2006

(54) MEDIA AUTHENTICATION USING ALTERED SECTOR SIZES

(75) Inventor: Douglas M. Carson, Cushing, OK (US)

(73) Assignee: DC IP, LLC, Cushing, OK (US)

( * ) Notice: Subject to any disclaimer, the term of this patent is extended or adjusted under 35 U.S.C. 154(b) by 328 days.

(21) Appl. No.: 10/411,990

(22) Filed: Apr. 11, 2003

Related U.S. Application Data

(60) Provisional application No. 60/372,281, filed on Apr. 12, 2002.

(51) Int. Cl.
    *G11B 7/00* (2006.01)

(52) U.S. Cl. .............. 369/53.21; 369/59.25; 369/59.26; 369/275.3; 711/163; 711/164

(58) Field of Classification Search ........... 369/53.21, 369/59.25, 59.26, 275.3; 711/163, 164
    See application file for complete search history.

(56) References Cited

U.S. PATENT DOCUMENTS

| | | |
|---|---|---|
| 5,463,604 A | 10/1995 | Naito |
| 5,513,160 A | 4/1996 | Satoh et al. |
| 5,633,841 A | 5/1997 | Yokota et al. |
| 5,687,158 A | 11/1997 | Kawasaki et al. |
| 5,712,837 A | 1/1998 | Horigome et al. |
| 5,787,068 A | 7/1998 | Arps et al. |
| 5,809,006 A | 9/1998 | Davis et al. |
| 5,812,512 A | 9/1998 | Tobita et al. |
| 5,831,964 A | 11/1998 | Tanaka |
| 6,058,087 A | 5/2000 | Tomita |
| 6,215,750 B1 | 4/2001 | Sako et al. |
| 6,477,124 B1 | 11/2002 | Carson |
| 6,487,155 B1 | 11/2002 | Carson et al. |
| 6,526,010 B1 * | 2/2003 | Morioka et al. ......... 369/47.15 |
| 6,661,768 B1 * | 12/2003 | Yumiba et al. ......... 369/275.4 |
| 6,853,611 B1 * | 2/2005 | Yoshimoto et al. ...... 369/53.21 |
| 2003/0081521 A1 * | 5/2003 | Solomon et al. ......... 369/53.21 |
| 2004/0008596 A1 * | 1/2004 | Yumiba et al. .......... 369/53.21 |

* cited by examiner

*Primary Examiner*—Wayne Young
*Assistant Examiner*—Van Pham
(74) *Attorney, Agent, or Firm*—Fellers, Snider, et al.

(57) ABSTRACT

Method and apparatus for authenticating a data storage medium (such as an optical disc including a compact disc, CD or a digital versatile disc, DVD) in which data are nominally stored in a plurality of sectors have a defined sector size containing a first total number of bits. A number of altered sectors are formed on the medium each having a second total number of bits different from the first total number of bits. The altered sectors will provide readback data at a different rate than a nominal rate determined by the defined sector size. The altered sectors are used to verify the medium as being an authorized copy and prevent unauthorized copying efforts.

32 Claims, 7 Drawing Sheets

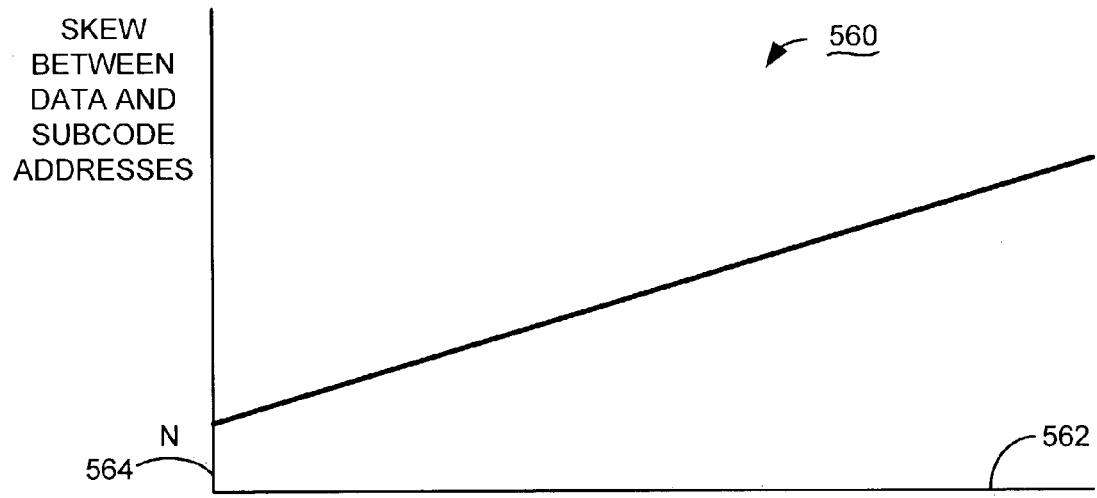
FIG. 14
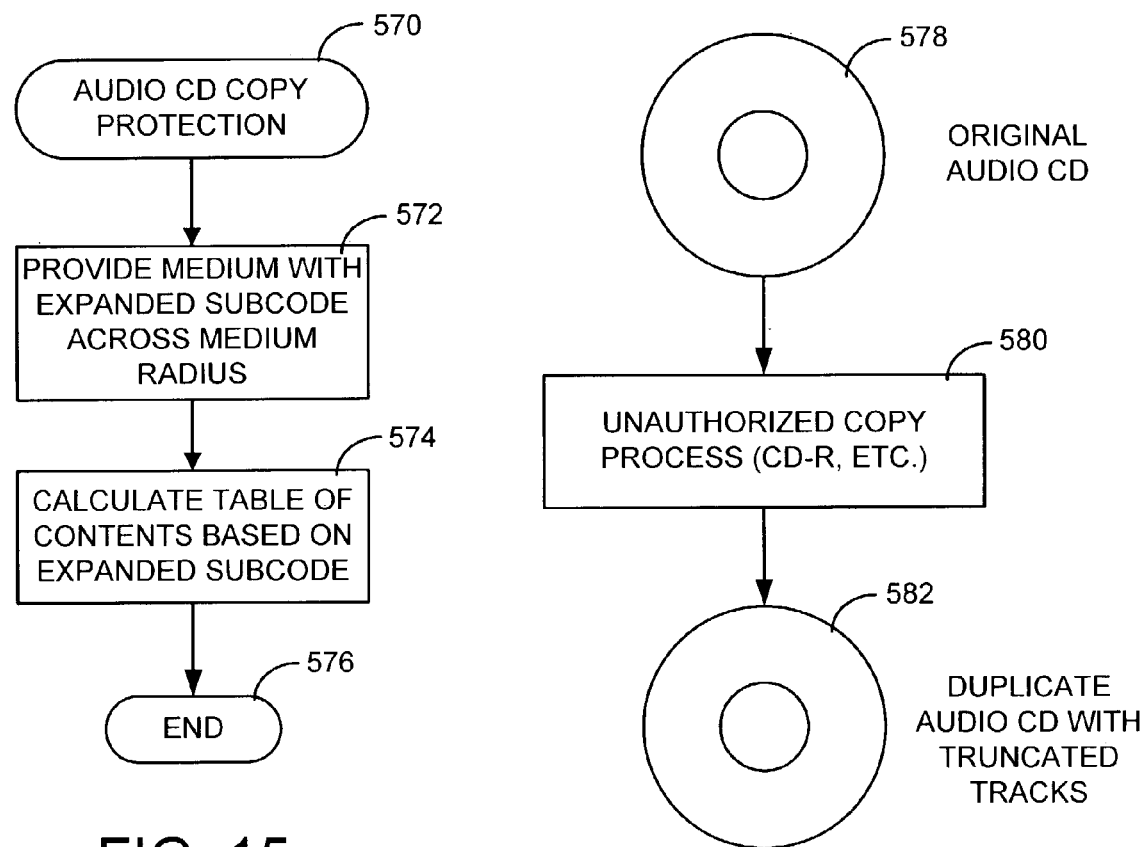
FIG. 15
FIG. 16

MEDIA AUTHENTICATION USING ALTERED SECTOR SIZES

RELATED APPLICATIONS

This application claims domestic priority under 35 U.S.C. § 119(e) to U.S. Provisional Application No. 60/372,281 filed Apr. 12, 2002.

FIELD OF THE INVENTION

The present invention relates generally to the field of data storage and more particularly, but without limitation, to the configuration of a data storage medium such as an optical disc with sectors of altered size for medium authentication purposes.

BACKGROUND

Optical discs are one type of data storage medium used to store a wide variety of digitally encoded data. Popular optical disc formats include compact discs (such as audio CD, CD-ROM, CD-R, CD-R/W) and digital versatile discs (such as DVD-audio, DVD-video, DVD-RAM, DVD-R, DVD-RW, DVD-ROM). Optical discs are usually portable in nature and can be played in a variety of settings including personal computers, car audio players, home theater systems, handheld personal data/entertainment devices, etc.

A typical optical disc comprises a circular disc having one or more recording layers of light reflective material embedded in a refractive substrate. Each recording layer is disposed along a plane substantially normal to an axis about which the disc is rotated and stores data in the form of localized pits and lands along a continuously extending spiral track. A data transducing head uses a laser or similar light source to output a readback signal based on the different reflectivities of the pit and land areas. Decoding circuitry decodes the user data for output by the appropriate playback device.

During readback, an optical disc typically provides main channel (user) data, subcode (control) channel data, and error detection/correction (EDC) channel data. Main channel data comprise the desired user data stored on the disc (audio, video, computer software, etc.) in fixed-size user data blocks (sectors). Control channel data comprise sector header, timing and other types of control information to facilitate playback of the main channel data. EDC channel data indicate the extent to which EDC techniques (parity bits, Reed-Solomon error correction codes, etc.) have been employed to correct detected errors in the main channel and control channel data.

The user data portion of an optical disc can be readily retrieved using various reading devices and stored onto other storage devices such as computer hard discs, floppy discs and recordable and re-recordable optical discs. Optical disc recording devices will accept this user data portion and add the additional address codes, synchronization data, error detection and correction codes, modulation data etc. using built-in per-programmed encoder circuits. This process is sometimes referred to as digital extraction or ripping.

It is thus relatively easy to make perfect digital copies of the user data portion of CD, DVD and other optical discs. However, due to the fact that these recorders use their own built-in and pre-programmed encoder circuits for the non-user data portion, it is much more difficult to create a perfect digital copy which includes all of the additional information contained on the original disc.

Due to the continued world-wide interest in the types of data available on optical discs and other types of media, and the relative ease with which unauthorized duplicate copies can be made, there remains a continued need for improvements in the art for medium authentication and copy protection schemes that are easily implemented and difficult to detect and defeat. It is to such improvements that the present invention is directed.

SUMMARY OF THE INVENTION

The present invention is generally directed to a method and apparatus for authenticating a data storage medium, such as an optical disc, as an authorized copy.

Data are nominally stored on the medium in a plurality of sectors have a defined sector size containing a first total number of bits. Additional data are inserted to form a number of expanded sectors each having an expanded sector size larger than the defined sector size. In this way, each expanded sector has a second total number of bits greater than the first total number of bits and will provide readback data at a different rate than a nominal rate determined by the defined sector size.

The expanded sectors are used to verify the medium as being an authorized copy and prevent unauthorized copying efforts. In some preferred embodiments, this generally entails measuring the elapsed time required to read the expanded sectors and comparing this elapsed time to a time that is required to read a number of standard sectors. In other preferred embodiments, the additional data are used to change the skew in addresses between main channel data and control data (subcode) channel data, and verifying the medium as authenticate if the desired amount and changes in skew are present. A digital payload of data can further be embedded in relation to the changes in the skew.

Specific types of media such as audio CDs can further be copy protected by continuously increasing the skew between the main channel and subcode channel across the radius of the medium and calculating the table of contents based on the subcode. In this way, a digital extraction transfer will only transfer a portion of each track onto an unauthorized, duplicate copy.

Preferably, the additional data are provided in suitable locations of the main channel, control channel and error detection and correction channels so that such additional data do not appear on a duplicated medium using a system that extracts the user data portion of the original medium and generates new control and error correction data.

These and various other features and advantages of the present invention will be apparent from a reading of the following detailed description in conjunction with the appended drawings.

BRIEF DESCRIPTION OF THE DRAWINGS

FIG. 14 is a graphical representation of another skew curve showing a continuous change in skew across the radius of an optical disc such as provided by the format of FIG. 9, with the changes in skew advantageously frustrating efforts to copy an audio CD.

FIG. 15 is a flow chart for an AUDIO CD COPY PROTECTION routine generally illustrative of steps carried out in accordance with preferred embodiments to copy protect an audio CD having a change in skew such as represented by FIG. 14.

FIG. 16 is a process flow illustrating the manner in which a duplicate audio CD created from an original disc formatted in accordance with the routine of FIG. 15 will have truncated tracks and will thus contain only a portion of each track as compared to the original disc.

DETAILED DESCRIPTION

As embodied herein, the present invention is generally directed to inserting additional data onto a data storage medium for authentication and copy protection purposes. As explained below, the additional data can be inserted in various ways including into a main channel, a control (subcode) channel and an error correction data channel, as desired. Moreover, the additional data can operate in a number of ways to prevent access to an unauthorized copy of the medium, or at least frustrate casual copying efforts.

Before discussing various embodiments of the present invention, it will be helpful to first provide an overview of readback systems and formats for various types of optical discs, which are a data storage medium for which the present invention is particularly well suited. It will be understood, however, that the present invention as embodied herein and as claimed below is not necessarily limited to systems and formats as now discussed.

Optical Disc Readback Systems

Figure 1:
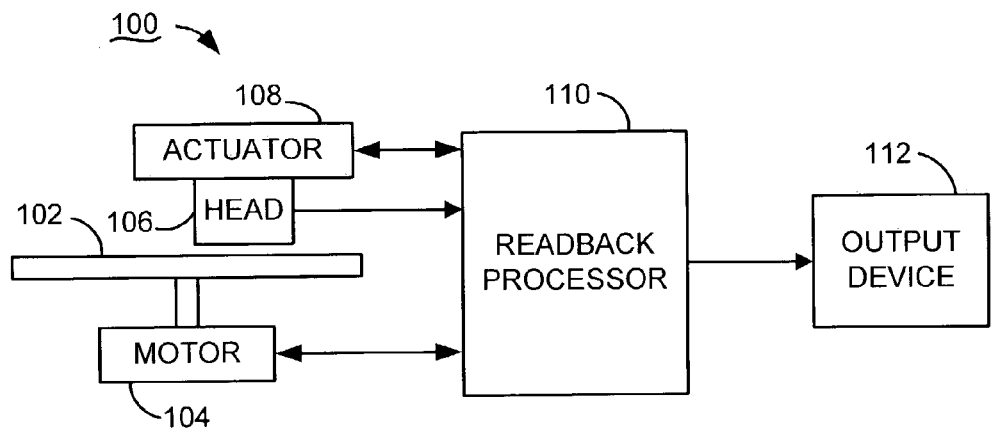
FIG. 1 shows a general block representation of a readback system used to readback data from a data storage medium, preferably comprising an optical disc.

FIG. 1 shows a simplified, functional block diagram of an optical disc readback system 100. An optical disc 102 is rotated by a disc motor 104. An optical disc pick-up assembly comprises a data transducing head assembly 106 supported by a linear actuator assembly 108. The actuator assembly 108 advances the head assembly 106 across the radius of the disc 102 during a disc access operation. It is common for optical discs such as 102 to have data stored thereon along a single, continuously spiraling track and to record the data at a constant linear velocity (CLV) so that the disc rotational speed is varied as the head assembly 106 moves across the radius of the disc 102. The motor 104 and actuator assembly 108 thus cooperate to cause the head assembly 106 to follow the track and transduce the data stored on the disc 102.

A readback processor circuit 110 receives a modulated readback signal from the head assembly 106 and performs the appropriate signal processing and conditioning to provide an output signal to an output device 112. The nature and character of the output device 112 will generally depend upon the type of data stored by the optical disc 102; for example, if the optical disc stores audio data, the output device 112 can comprise an automobile or home stereo system; if the optical disc stores computer data (including MP3 audio files), the output device 112 can comprise a personal computer (PC); if the optical disc stores video data, the output device 112 can comprise a television or home theater system, etc.

Figure 2:
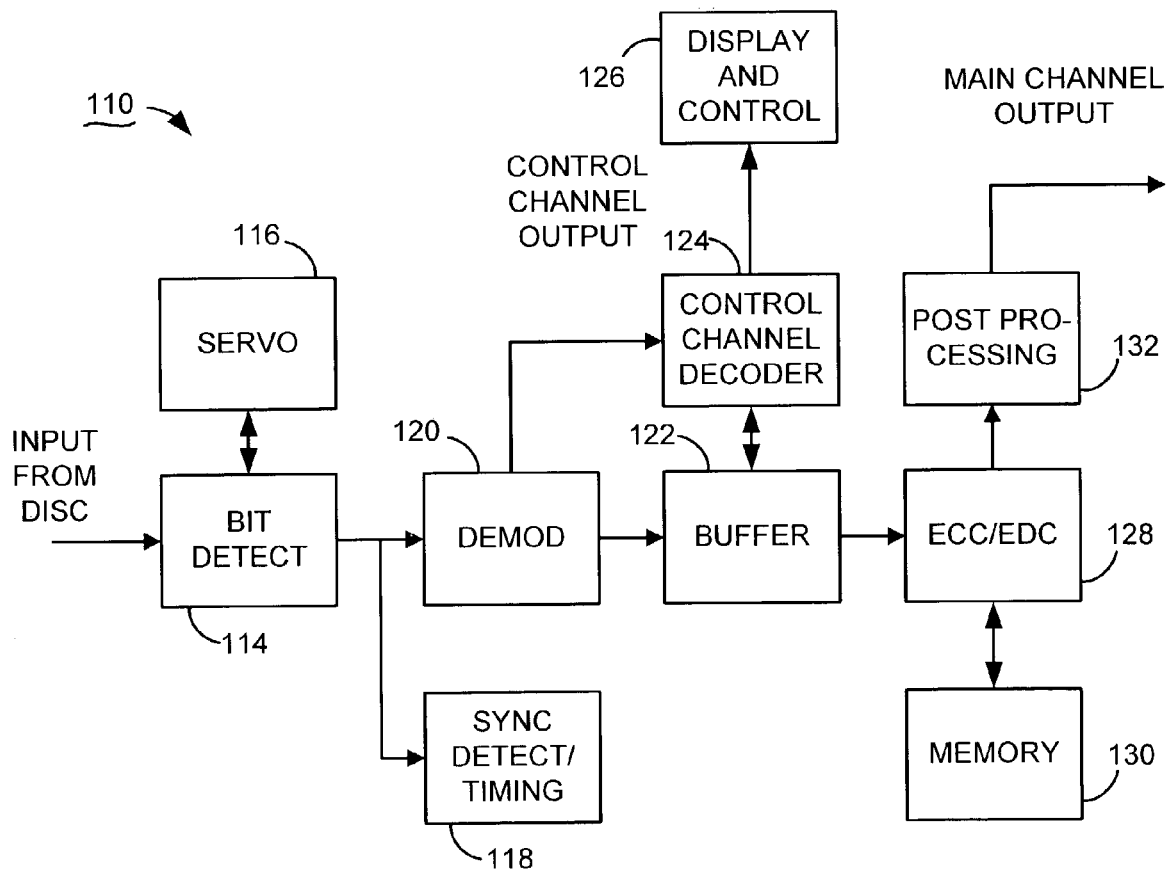
FIG. 2 shows a generalized block diagram of a readback circuit of a readback system such as shown in FIG. 1.

FIG. 2 provides a generalized functional block diagram of the readback processor circuit 110 of FIG. 1. It will be understood that FIG. 2 represents a generalized architecture and various modifications and additional details have been omitted for clarity of discussion.

The readback signal obtained from the disc 102 is provided to a bit detect circuit 114 which performs bit detection and other preliminary processing. The bit detect circuit 114 interfaces with a servo control circuit 116 which provides control signals to the motor 104, head assembly 106 and actuator assembly 108.

The output from the bit detect circuit 114 is provided to a synchronization (sync) detection and timing circuit 118 which provides timing signals to various remaining blocks of the circuit (via signal paths not shown for clarity). A demodulation (demod) circuit 120 performs the requisite demodulation of the readback signal to recover the original digital bit sequence. For reference, 8/14 modulation is typically employed for CDs and 8/16 modulation is typically employed for DVDs; thus, the demod 120 converts each set of 14 or 16 received channel bits back into the original 8 bits of digital data.

The recovered data are provided to a buffer 122. A control channel decoder 124 decodes the control channel (header, timing, etc.) portion of the recovered data and provides the requisite inputs to a user display and control block 126. An error correction code/error detection code (ECC/EDC) module 128 performs error detection and correction operations (using memory 130) and outputs corrected data to a post-processing unit 132, which provides final processing of the data and outputs the main channel data to the output device 112 (FIG. 1).

General Compact Disc (CD) Format

Figure 3:
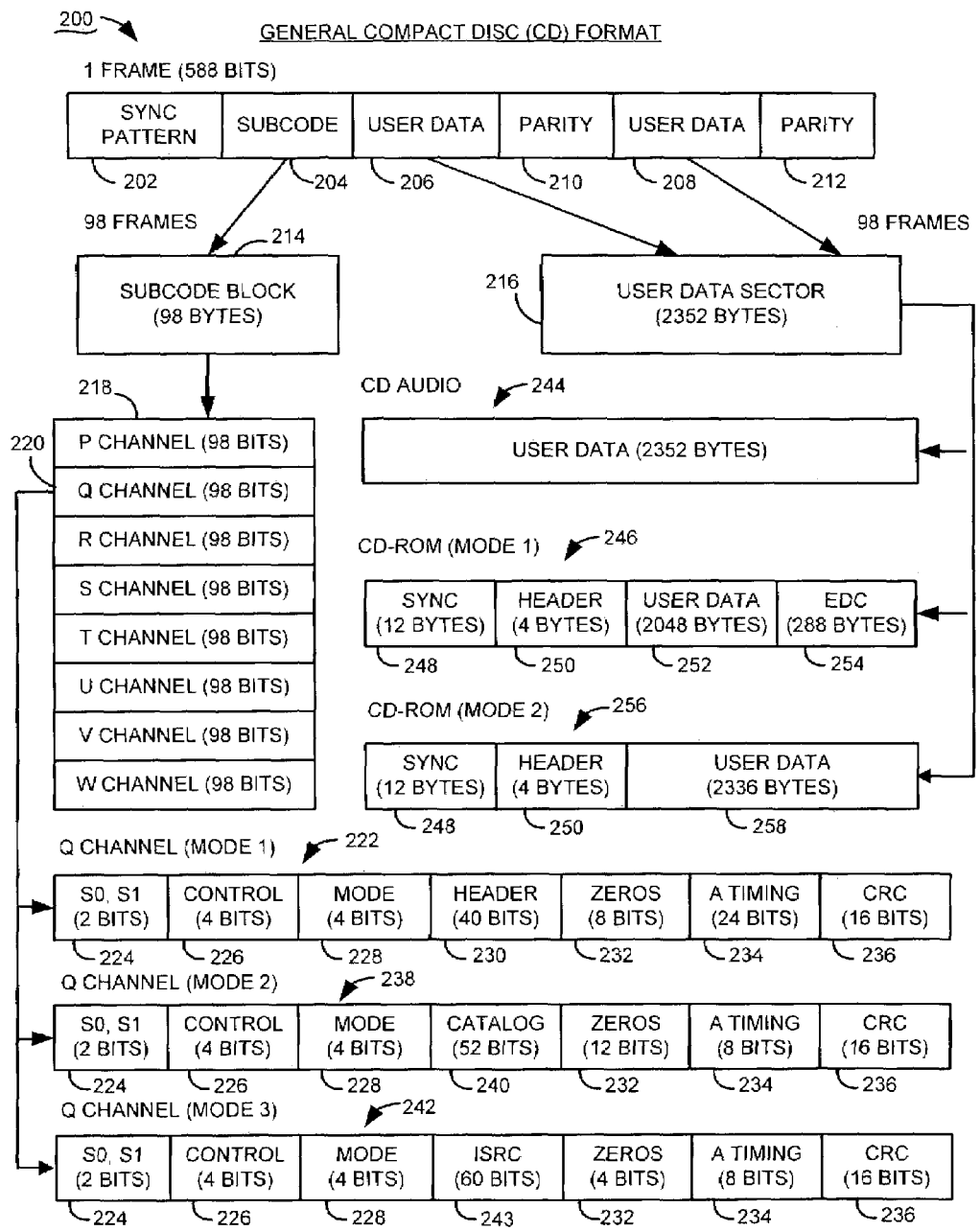
FIG. 3 generally illustrates the manner in which data are stored on a compact disc (CD).

FIG. 3 provides a diagram generally illustrating the manner in which data are typically formatted on a compact disc (CD). It will be noted that a number of different CD formats are used in the industry in accordance with established standards, including ICE 908 ("Red Book"—CD audio), ISO/IEC 10149 ("Yellow Book"—CD-ROM), ISO/IEC 11172/1/2/3 ("Orange Book"—CD-R), etc. Thus, it will be understood that FIG. 3 is a generalized format representation and is not exhaustive.

The basic unit of data storage on a CD is referred to as a frame (numerically designated at 200). Each frame 200 comprises 588 channel bits and generally includes a leading synchronization pattern field 202, a subcode field 204 user data fields 206 and 208, and parity (error correction) fields 210 and 212.

Each consecutive sequence of 98 frames constitutes a top-level sector (block) having two components: a subcode block 214 (98 bytes) and a user data sector 216 (2352 bytes). Readback systems (such as 110, FIGS. 1 and 2) continuously adjust the rate at which data are retrieved so as to maintain a selected number of sectors per second. For example, in the case of 1× CD, a total of 75 sectors are read per second using a nominal clock frequency of 4.3218 Megahertz (MHz). Higher readback rates (16×, 24×, 40× etc.) use correspondingly higher frequencies and recover correspondingly higher numbers of sectors per second.

Each frame includes 8 data bits (14 channel bits) of subcode, referred to as P, Q, R, S, T, U, V and W bits. Hence, each subcode block 214 includes a 98 bit P channel 218, a 98 bit Q channel 220, etc. Only the P and Q channels 218, 220 are currently used during normal disc operation. The R through W channels are reserved (and thus not normally used during disc operation), but these channels could also be adapted for copy protection purposes as described herein.

The P channel 218 provides lead-in and lead-out data and identifies spaces between tracks. The Q channel 220 provides header and timing data and thus is of particular relevance to the present discussion.

As will be recognized by those skilled in the art, there are three modes (configurations) of the Q channel 220. Mode 1 (represented at 222) is used most extensively on a typical CD and includes an S0 and S1 synchronization field 224, a control field 226 (including copy protection bits), a mode (ADR) field 228, a header field 230, a zeros field 232, an absolute timing field 234 and cyclical redundancy correction (CRC) error correction field 236.

Of particular interest is the header field 230. In the initial lead-in portion of the disc, the contents of the header field 230 provide table of contents (TOC) data; that is, the number of tracks and the length of each track (minutes, seconds, and frames). In the data storage portion of the disc, the contents of the header field 230 provide elapsed time (address) data (minutes, seconds, and frames).

Mode 2 (represented at 238) generally uses the same or similar fields as Mode 1, and such similar fields have been numerically identified accordingly. One difference is the use of a catalog field 240 in place of the header field 230 of Mode 1. The catalog field 240 stores a catalog number used to identify the contents of the disc. Mode 3 (represented at 242) uses an International Standard Recording Code (ISRC) field 243 which stores an ISRC for the contents of the disc (typically only used for audio CDs).

The format of the 2352 byte user data sector 216 depends on the format of the CD. Audio CDs simply store 2352 bytes of user data in this space, as denoted at 244. CD-ROMs have two modes (not to be confused with Q channel modes discussed above). CD-ROM Mode 1 (denoted at 246) includes a 12-byte synchronization (sync) field 248, a 4-byte header field 250, a 2048-byte user data field 252 and a 288-byte error detection and correction (EDC) field 254. The header field 250 also provides address data in the form of elapsed time (minutes, seconds and frames).

CD-ROM Mode 2 (denoted at 256) stores 2336 bytes of user data in an expanded user data field 258 and does not have an EDC field, as in CD-ROM Mode 1. The sync fields 248 and header fields 250 are otherwise identical as in CD-ROM Mode 1.

General Digital Versatile Disc (DVD) Format

Figure 4:
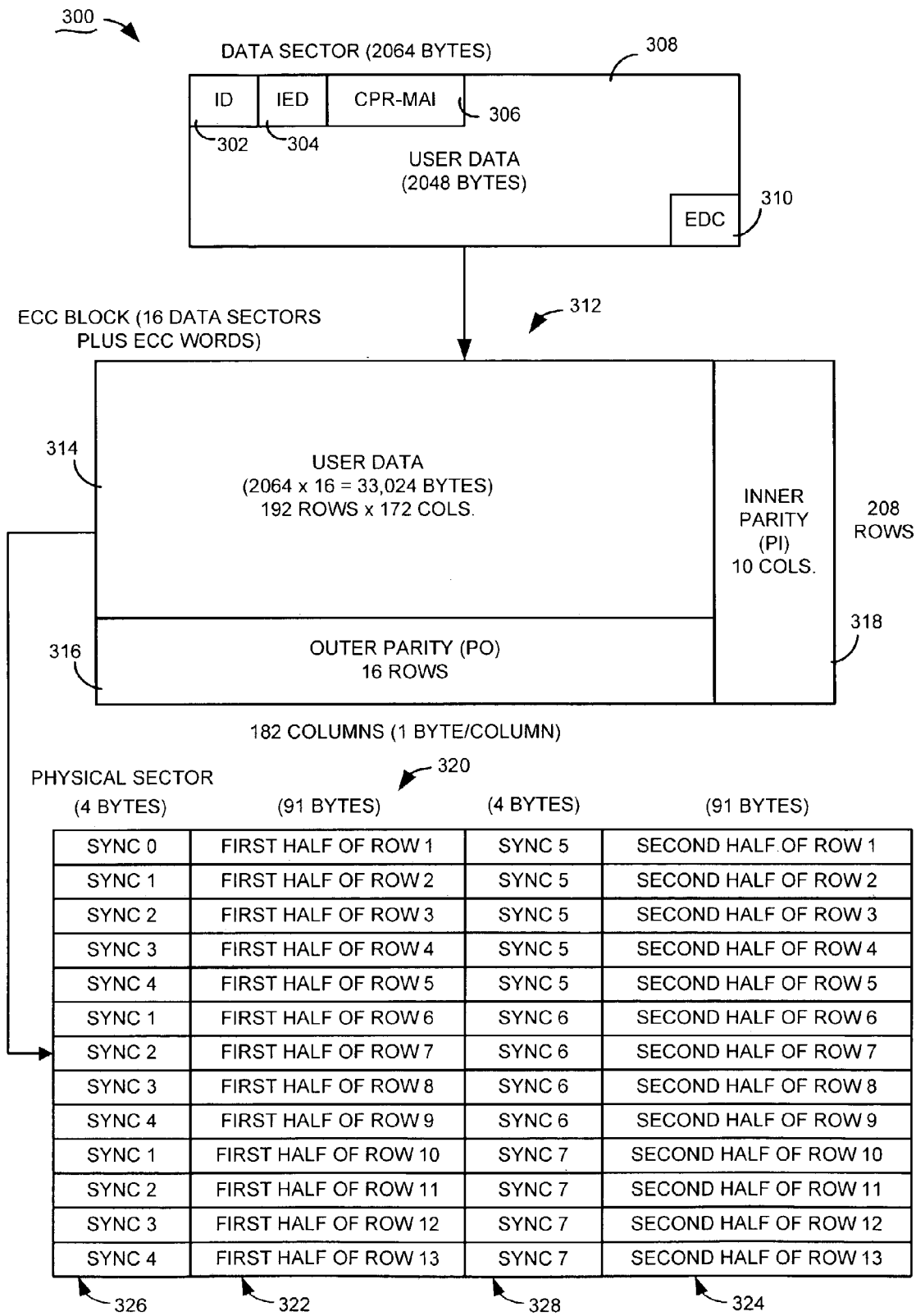
FIG. 4 generally illustrates the manner in which data are stored on a digital versatile disc (DVD).

FIG. 4 provides a general representation of the manner in which data are stored on a DVD. Generally, the same overall format and data structure are used regardless of whether the DVD stores audio, video and/or computer software.

The basic block in a DVD is referred to as a 2064 byte data sector, as shown at 300. The data sector 300 includes a 4-byte identification (ID) field 302, a 2-byte ID error detection (IED) field 304, a 6-byte copyright management information (CPR-MAI) field 306, a 2048-byte user data field 308, and a 4-byte error detection code (EDC) field 310.

Each set of 16 consecutive data sectors 300 are grouped together into an error correction code (ECC) block 312 having 208 rows and 182 columns (one byte/column). The user data from the 16 data sectors 300 are interleaved into a user data block 314 (2064×16=33,024 bytes). Outer parity (PO) Reed Solomon correction codes are calculated for the columns of user data (as indicated at 316). Inner parity (PI) Reed Solomon correction codes are calculated for the rows of user data and PO codes (as indicated at 318).

A total of 16 physical sectors (one shown at 320) are then formed from the ECC block 312. Each row of 182 bytes is divided into a first 91 byte portion 322 and a second 91 byte portion 324, and a number of 4-byte synchronization patterns (denoted generally at 326, 328) are inserted in front of each portion 322, 324 as shown. A total of eight different sync patterns (sync 0 to sync 7) are used. The physical sector 312 represents the manner in which the data are actually written to the DVD.

It will now be recognized that a minimum of 16 physical sectors 320 need be retrieved during each disc access operation, even if the contents of a single sector are desired. As with CDs, DVD readback systems (such as 110, FIGS. 1 and 2) continuously adjust the rate at which data are retrieved so as to maintain a selected number of sectors per second. In the case of 1× DVD, a total of 676 sectors are read per second using a nominal clock frequency of about 26.16 Mhz. Higher readback rates (16×, 24×, 40×) use correspondingly higher frequencies and recover correspondingly higher numbers of sectors per second.

Medium Authentication

Having concluded an overview of optical disc readback systems and CD and DVD formats, various preferred embodiments of the present invention to provide medium authentication will now be discussed.

As used herein, "authentication" will be understood to generally describe a scheme whereby a disc (or other medium) can be determined as coming from an authorized source (i.e., an "original" disc), or as having been produced using an unauthorized process (i.e., a "pirated" disc). As explained below, this generally entails providing an original disc with particular features such that, when a pirated disc is made from the original disc, the features do not appear on the pirated disc.

"Copy protection" describes a particular type of medium authentication whereby the disc (or other medium) is configured in such a way such that a pirated disc will not operate properly in a readback system. One type of copy protection discussed below involves configuring an original disc in such a way so that the readback system grants access to the original disc, but denies access to a pirated disc created from the original disc.

Another type of copy protection discussed below generally involves providing an original disc with a data format that causes a pirated disc created from the original disc to be able to be accessed by a playback system. However, the playback results from the pirated disc are significantly degraded as compared to the results obtained during playback of the original disc.

A first embodiment of the present invention generally involves altering the size of selected sectors on an optical disc so as to change the rate at which data from such sectors are recovered.

For example, each top level CD sector has a total of 57,624 channel bits (98 frames×588 channel bits/frame=57, 624 bits). As mentioned above, using 1X readback a read clock of 4.3218 MHz will recover exactly 75 sectors per second. If an additional 4,116 "dummy" bits were appended to each of a number of altered (expanded) sectors, each expanded sector would have 61,740 bits. Using the same readback frequency of 4.3218 MHz, only 70 of these expanded sectors would be retrieved per second.

Since digital buffering and synchronization pattern detection efforts are employed, the operational performance of a readback system (such as 110) will generally not be adversely affected by the inserted data. While sector expansion is preferred, it will be noted that similar results can be obtained by reducing the size of particular sectors so long as early receipt of a synchronization field does not inhibit readback operation.

Figure 5:
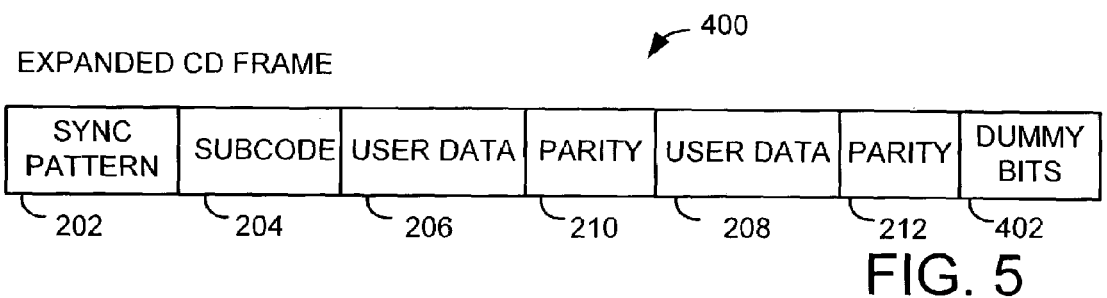
FIG. 5 generally illustrates a format for an expanded CD frame which has additional data inserted therein in accordance with preferred embodiments.

One preferred way to insert data is to simply append a number of "dummy" bits at the end of each CD frame, such as shown at 400 in FIG. 5. The expanded frame 400 in FIG. 5 is generally similar to the standard CD frame 200 in FIG. 3 (and like reference numerals have been used for similar fields). To accommodate an additional 4,116 bits in accordance with the present example, 42 dummy bits can be appended in a dummy field 402 after the second parity field 212.

The reason these additional bits will not interfere with the normal processing of the CD data is based on the manner in which each frame is identified. The sync pattern field 202 stores the following top-level 24-channel bit sync pattern: "100000000001000000000010." Once all of the contents of a selected frame are successfully recovered, the sync detect/timing circuit 118 (FIG. 2) searches the modulated bit stream until the above pattern is identified; hence, repeating portions of (or the entire) sync pattern in the dummy field 402, or placing any legal sequence of bits, will not affect operation of the readback circuit 110 to any relevant extent.

Figure 6:
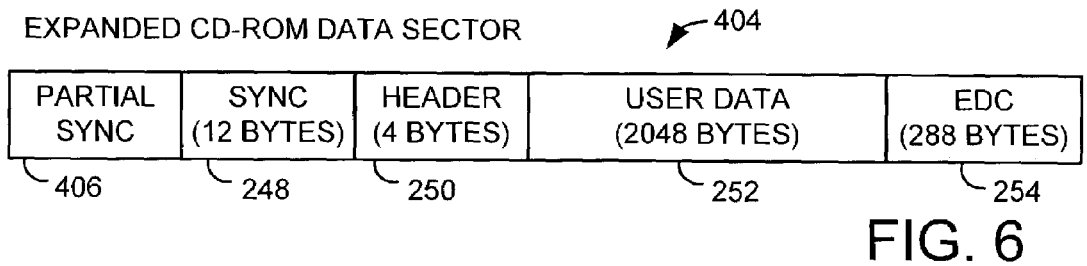
FIG. 6 generally illustrates a format for an expanded CD-ROM data sector with additional data inserted therein.

The additional data can be inserted in other ways as well. FIG. 6 shows an expanded CD-ROM (Mode 1) data sector 404, generally similar to the standard CD-ROM data sector 246 of FIG. 3 (and like numerals have been provided for similar fields). The 12-byte sync field 248 uses one byte of zeros, ten bytes of ones, and one byte of zeros (i.e., 00000000 1111 11111111 1111 . . . 1111 1111 0000 0000). The additional data can be placed in a partial sync field 406 immediately before the sync field 248 as shown.

As before, any number of combinations of bit sequences can be used in the partial sync field 406. Depending upon the application, the partial sync field 406 could be configured to store the full 12-bytes of sync pattern so that the entire pattern is stored twice. In this case, an initialization signal based on receipt of the dummy sync pattern would be immediately followed by a second initialization signal based on decoding of the true (second) sync pattern, and the circuit would truncate or discard any initial operations and start over in response to the second initialization signal.

Figure 7:
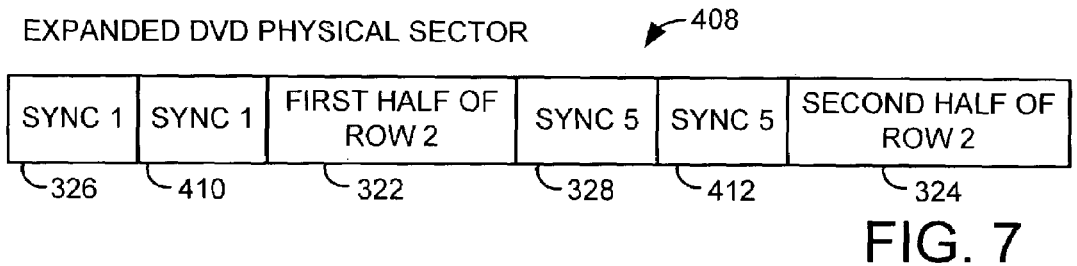
FIG. 7 provides a portion of a physical sector of a DVD to illustrate a preferred manner for inserting additional data therein.

The use of an expanded sector size is not limited to CDs; FIG. 7 provides an exemplary format for an expanded DVD physical sector 408. FIG. 7 shows a single row (i.e., row 2) of the physical sector 320 of FIG. 4 with the addition of a second sync 1 field 410 and a second sync 5 field 412. In this case, the DVD readback processing circuit will delay processing of the data in the 91-byte portion immediately following each set of redundant sync fields 326, 410 and 328, 412. Additional sync fields such as 410, 412 can be added to every row or only selected rows of the physical sector 320. Alternatively, the additional sync fields 410, 412 can be advantageously placed ahead of the true sync fields 326, 328 and can store either a full or partial sync pattern (or other data).

It will be noted that the foregoing locations for the additional bits are exemplary and other arrangements can be selected as desired. Also, the use of additional bits to form expanded sectors is not limited to CD and DVD formats of optical discs, but to any number of other existing or future adapted formats and media types. The additional bits are preferably added in such a way that the additional bits will not be present on a duplicated medium. In this way, copying systems (such as CD-R drives and associated software) which extract the actual user data and generate new control and EDC data will not provide the duplicate copy with the expanded sector sizes in the selected locations.

Figure 8:
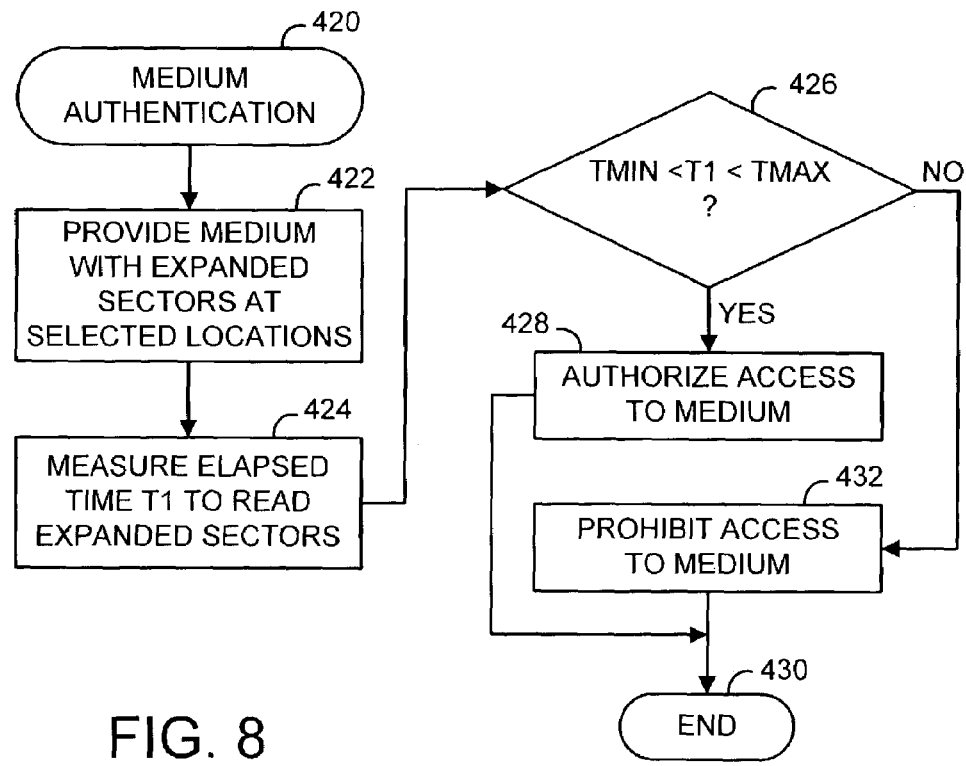
FIG. 8 is a flow chart for a MEDIUM AUTHENTICATION routine generally illustrative of steps carried out in accordance with preferred embodiments to authenticate an optical disc having additional data inserted therein such as exemplified by FIGS. 5–7.

FIG. 8 provides a flow chart for a MEDIUM AUTHENTICATION routine 420 generally illustrative of steps carried out in accordance with preferred embodiments to provide authentication using expanded sectors such as discussed above with regard to FIGS. 5–7. A medium (such as the optical disc 102, FIG. 1) is provided with expanded sectors at selected locations, step 422. During initialization (e.g., when the disc 102 is first spun-up by the readback system 100), the routine instructs the readback circuit 110 to measure an elapsed time T1 required to read the expanded sectors, step 424. As desired, a corresponding number of additional standard (non-expanded) sectors can be read and the elapsed time to read the standard sectors can be determined to establish a benchmark.

The flow continues to decision step 426 wherein the routine determines whether the elapsed time T1 indicates the presence of expanded sectors. To account for system variances, this is preferably carried out by establishing a selected range of elapsed time from a minimum value (TMIN) to a maximum value (TMAX) based on the benchmark time, and comparing the time T1 to the selected range.

When the time T1 falls within the selected range, the medium is determined to be authentic and access is granted as shown at step 428, after which the routine ends at step 430. Contrawise, if the time T1 does not fall within the selected range, the medium is determined to not have expanded sectors in the selected locations and further access is prohibited as shown at step 432. The routine then terminates at step 430, as before.

Another way that additionally inserted data can be used for medium authentication purposes involves adjusting skew between user data sector addresses and subcode block addresses. For example, it will be recalled from the CD format diagram of FIG. 3 that both subcode blocks (212, FIG. 3) and user data sectors (214, FIG. 3) are each provided with header (address) data. For each top level sector, it is a common practice to provide the subcode with an address that leads the address of the user data sector by a selected amount, such as three to seven address increments (this difference is referred to as the skew).

During a seek operation by the readback system 100, the servo circuit 116 uses the subcode address data to bring the head assembly 106 into the desired alignment with the target sectors. In this way, the head assembly 106 is consistently positioned to receive the target user data, and overshoot and the need for subsequent corrective seeks are avoided.

Figure 9:
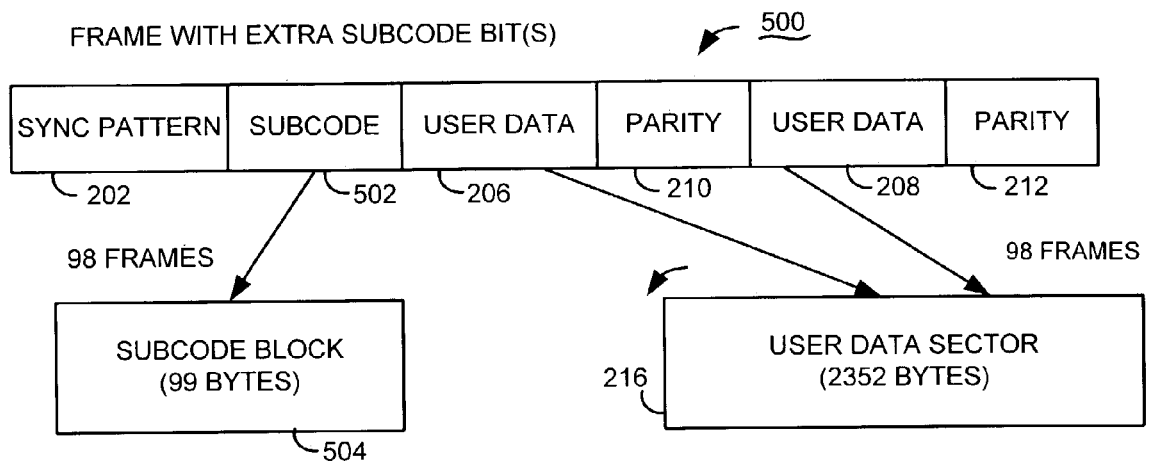
FIG. 9 generally illustrates a format for an expanded CD frame having additional bits inserted into the subcode channel to controllably vary the relative skew between user data addresses and subcode addresses in accordance with preferred embodiments.

FIG. 9 provides a block diagram of an expanded frame 500 which is similar to the standard frame 200 of FIG. 3. The expanded frame 500 is provided with a number of additional subcode bits inserted into a subcode field 502 at a selected rate such that each sector (98 frames) provides an expanded subcode block 504 with more than 98 bytes of data. In the example of FIG. 9, eight additional bits of data are added over the 98 frames so that the expanded subcode block contains 99 bytes instead of the conventional 98 bytes. In such a case only a few of the 98 frames in the top level sector will receive the additional bits and most of the 98 frames will have the standard frame configuration shown in FIG. 3.

Using the example of FIG. 9, after 99 consecutive sectors with the additional subcode bits, the subcode block address of the $100^{th}$ top level sector will be increased by one address increment as compared to the user data sector address of the sector. That is, if the initial skew was three address increments, after 100 sectors the skew will now be four. This change in skew is represented generally by FIG. 10, which provides an address skew curve 506 plotted against an x-axis 508 indicative of disc radius and a y-axis 510 indicative of the skew between data and subcode addresses. Sectors in region 512 use conventional frames 200 as shown in FIG. 3 up until address location A, and the skew between the data and subcode addresses is identified by an integer N. Beginning at location A, additional subcode bits are added to consecutive sectors as shown by sloped region 514 until address location B is reached and a skew of N+1 is achieved. Thereafter, sectors in region 516 also use the standard frame configuration and maintain the increased skew of N+1.

It will be noted that changes in skew could also be obtained by omitting subcode from a number of consecutive sectors. This would cause a reduction in skew over time. However, conventionally used test equipment checks for the presence of the subcode and will identify missing subcode fields, whereas the presence of additional subcode bits will tend to go undetected and unreported.

Figure 10:
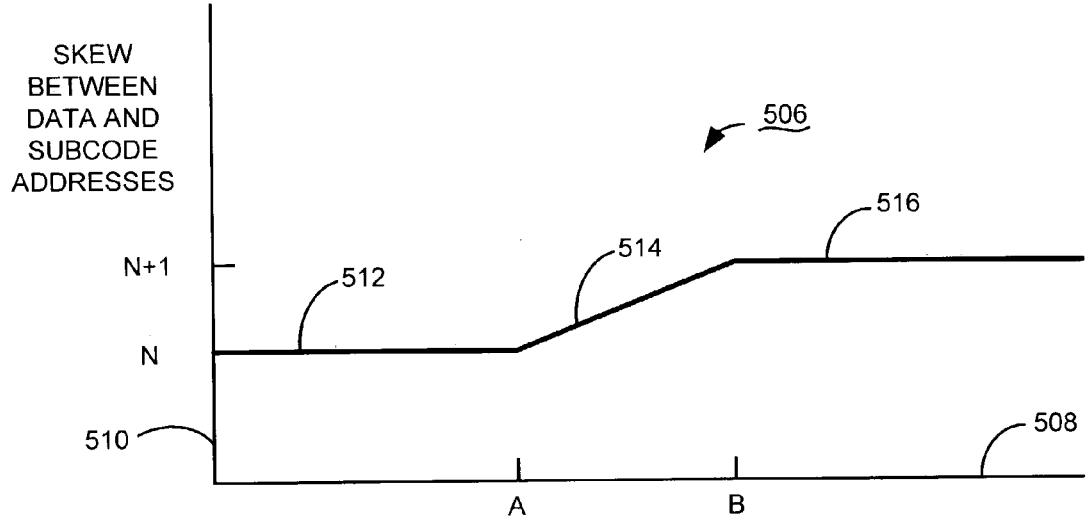
FIG. 10 is a graphical representation of a skew curve showing a change in skew across the radius of an optical disc such as provided by the format of FIG. 9.
Figure 11:
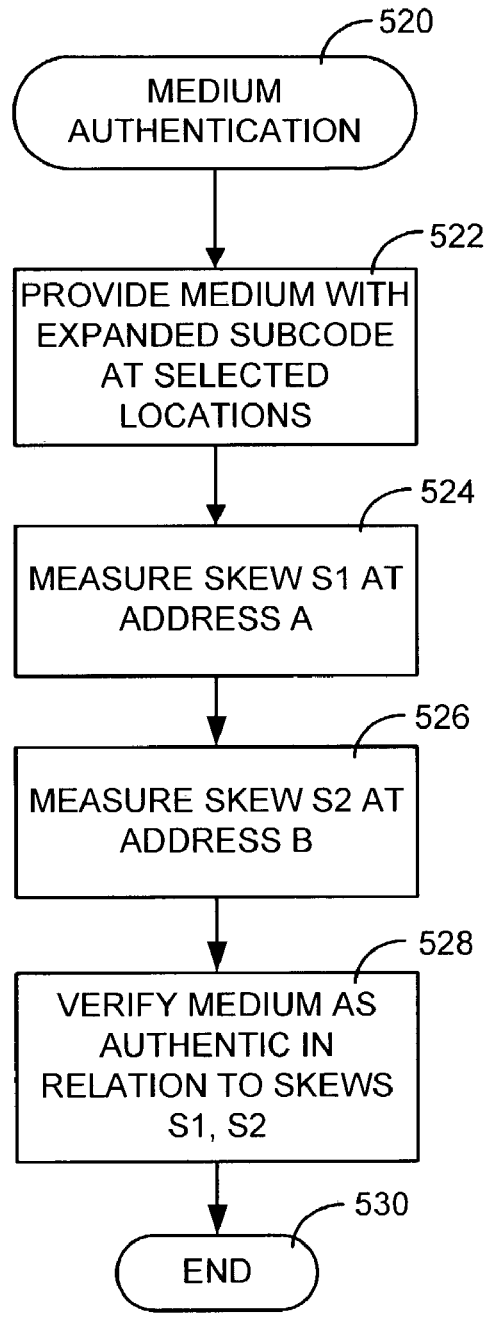
FIG. 11 is a flow chart for a MEDIUM AUTHENTICATION routine generally illustrative of steps carried out in accordance with preferred embodiments to authenticate a medium such as an optical disc having a change in skew such as represented by FIG. 10

FIG. 11 provides a flow chart for a DISC AUTHENTICATION routine 520 illustrative of steps carried out to authenticate a disc formatted in accordance with FIGS. 9 and 10.

At step 522, during data recording or mastering the disc is provided with sectors having expanded subcode at selected locations. At step 524, when the disc is first accessed a first skew measurement S1 is taken at a first address (such as the address A). This can be carried out by performing a seek in which both subcode header and user data header data are retrieved. A second skew measurement S2 is taken at a second address (such as the address B) at step 526. An authentic disc will have the expected change in skew between the S1 and S2 measurements whereas an unauthorized disc will not.

Accordingly, the disc is verified as authentic in relation to the skew measurements S1 and S2, as shown at step 528, after which the routine ends at 530. The foregoing steps are particularly advantageous in a computer software disc (CD-ROM, etc.) since the application program on the computer hard drive can be used to carry out the routine and unlock (or prevent access to) the disc.

Figure 12:
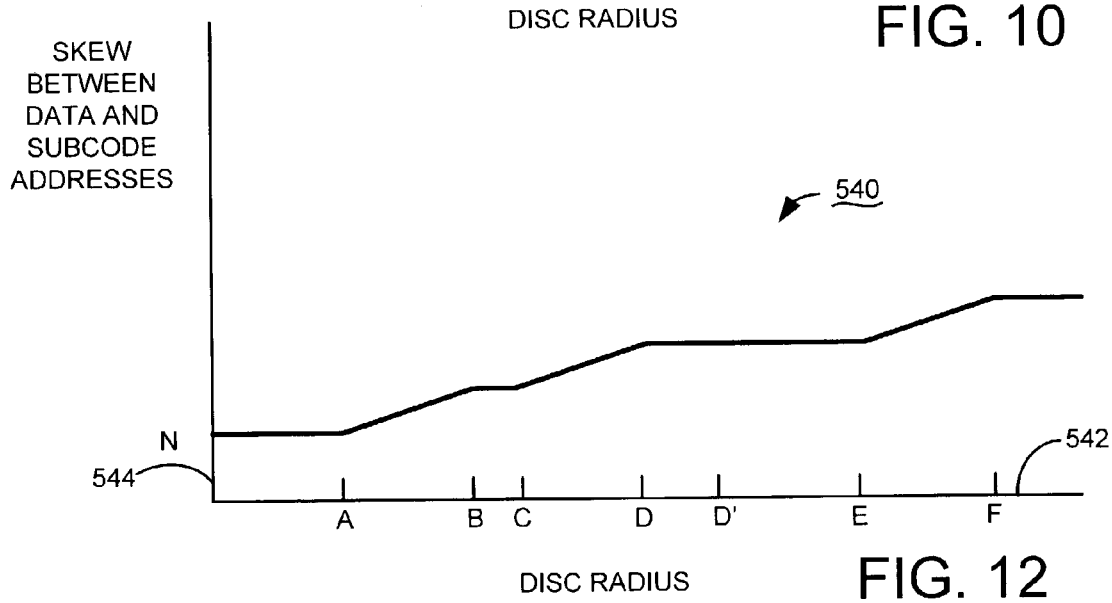
FIG. 12 is a graphical representation of another skew curve showing selected changes in skew at various locations across the radius of an optical disc such as provided by the format of FIG. 9, with the changes in skew further provided to embed a payload of secondary data in relation to the locations of the changes in skew.

Changes in skew can further be used to embed secondary data to the disc. FIG. 12 provides a graphical representation of a skew curve 540 for a particular disc, plotted against a disc radius x-axis 542 and a skew y-axis 544. The disc is provided with a number of regions where the skew is incremented, as indicated by skew transition points A–F. The locations where such skew changes occur (or do not occur) can be preselected to correspond to a digital payload of data which can comprise a decryption key, forensic tracking information, etc. used to unlock the disc or otherwise provide useful information relating to the disc.

Figure 13:
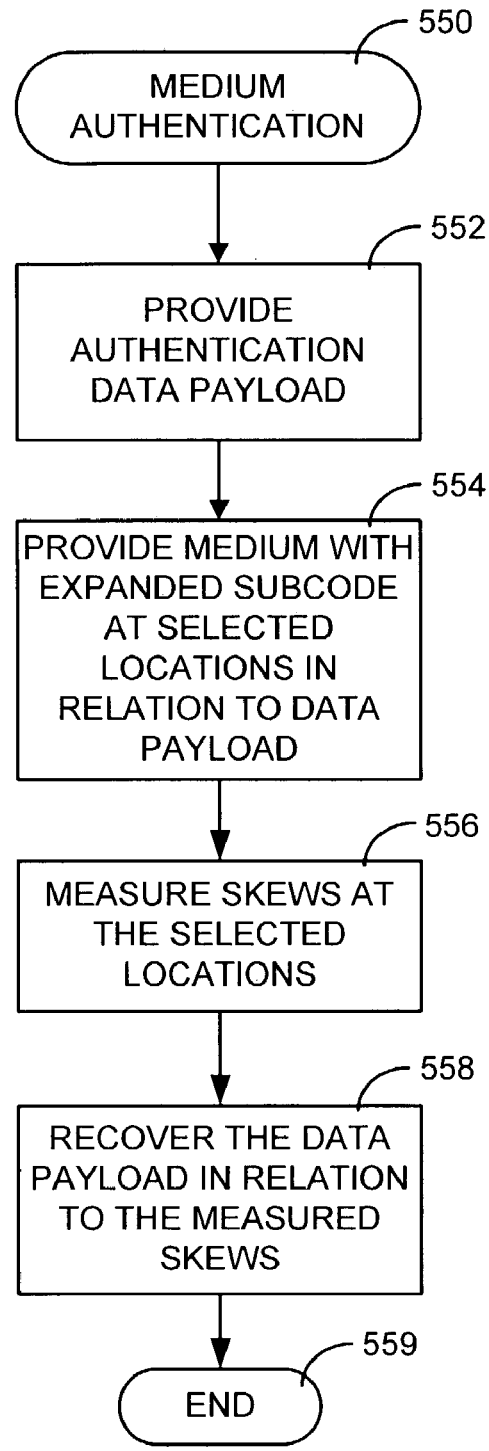
FIG. 13 is a flow chart for a MEDIUM AUTHENTICATION routine generally illustrative of steps carried out in accordance with preferred embodiments to authenticate a medium such as an optical disc having a change in skew such as represented by FIG. 12.

FIG. 13 provides another MEDIUM AUTHENTICATION routine 550 which uses a format such as shown in FIG. 12. An authentication data payload is first selected at step 552. For example, a six-bit payload can be formulated from FIG. 12 by assigning a logical "1" if a skew change occurs over each selected interval, and by assigning a logical "0" if no skew change is detected over each selected interval. Thus, the interval A–B would represent a logical 1, B–C would represent a logical 0, C–D would represent a logical 1, D–D' would represent a logical 0, D'–E would represent a logical 0, and E–F would represent a logical 1. Using this scheme at these transition points would result in the digital payload of 101001. At step 554, the medium is provided with expanded subcode at selected locations to embed the payload.

Thereafter, during each initial medium access operation the relative skews between user data and subcode addresses are measured at the corresponding selected locations, step 556. The measured skews are used to recover the data payload at step 558 which is used to unlock or otherwise verify the contents of the disc. The routine then ends at step 559.

Those skilled in the art will recognize that in today's environment it is relatively difficult to prevent unauthorized duplication of audio CDs. An array of extraction programs available via the Internet, as well as the advent of advanced compression technologies such as MP3 (MPEG) make it simple for even the most casual and unsophisticated copyists to download and store massive libraries of pirated audio files. The aforementioned skew modification techniques can be applied to an audio CD in such a way as to prevent, or at least frustrate, such efforts.

While it is generally true that present audio CD formats (see FIG. 3) do not provide separate header data in the user data sector (that is, the user data sector simply records audio samples), nevertheless the user data in the user data sectors are assigned addresses which are reflected by the subcode. The table of contents (TOC) in the lead-in portion of the audio disc (provided by the Mode 1 Q-channel data therein) nominally identifies the number of tracks and the duration (addresses) of each.

To access a selected track, the readback system 100 performs a seek relying upon the subcode addresses (Mode 1 Q-channel data in the playback area) to bring the head assembly 106 into the general region of the starting of the selected track. The readback system 100 then relies upon the P-channel data to find the "empty space" between tracks and begins playback of the selected track after such empty space has been found.

Thus, one way to provide an audio CD with a measure of copy protection is to continuously vary the skew across the radius of the disc. This is represented by FIG. 14, which shows a graphical representation of a skew curve 560 for an audio CD plotted against a disc radius x-axis 562 and a skew y-axis 564. This skew results in the subcode channel operating at a lower rate than the main channel sector rate. The TOC in the lead-in portion of the disc is calculated in relation to the subcode blocks and therefore will indicate fewer user data sectors in each track than are actually present. This will not affect the ability to either play through the disc or to seek to each track starting point.

However, calculations performed to compute the actual length of each track based on the TOC will give lengths that are shorter than the actual music length of the main data channel in each track. Digital transfers made based upon the TOC will always result in a certain amount of data missing at the end of each track.

These steps are illustrated by FIGS. 15 and 16. FIG. 15 provides an AUDIO CD COPY PROTECTION routine 570, representative of steps carried out during mastering of an original CD audio disc. Conventional steps are taken to format and record the data except that the disc is provided with expanded subcode across the radius of the disc, as shown by step 572, and the TOC is calculated (and stored) based on the expanded subcode at step 574 (the routine ends at step 576).

FIG. 16 provides a schematic flow diagram during subsequent unauthorized processing of an original disc 578 formatted by the routine of FIG. 15. Subjecting the original disc 578 to an unauthorized copy system 580 (such as a CD-R drive) will result in a duplicate disc 582 having truncated tracks. For example, if a skew rate of about 70% is selected during step 572 of FIG. 15 (so that the subcode runs slower at a rate of 70% of the main channel data), then about the last 30% of each audio track will be missing on the duplicate disc 582.

Thus, a five minute song on the original disc will only have about the first three and a half minutes on the duplicate disc 582, thereby frustrating at least casual efforts to rip the contents of the original disc using digital transfer extraction techniques. It will be noted that the routines of FIGS. 15 and 16 can be readily adapted to other formats that use readback systems that simply output user data from the data blocks and do not have the capability of first polling the medium for authentication purposes.

It is to be understood that even though numerous characteristics and advantages of various embodiments of the present invention have been set forth in the foregoing description, together with details of the structure and function of various embodiments of the invention, this detailed description is illustrative only, and changes may be made in detail, especially in matters of structure and arrangements of parts within the principles of the present invention to the full extent indicated by the broad general meaning of the terms in which the appended claims are expressed. For example, the particular elements may vary depending on the particular application without departing from the spirit and scope of the present invention.

In addition, although embodiments described herein are generally directed to authentication of optical discs, it will be appreciated that any number of different formats and types of optical discs, as well as any number of other formats and types of data storage media can be readily utilized without departing from the spirit and scope of the claimed invention.

What is claimed is:

1. A method comprising a step of providing a data storage medium with a plurality of addressable sectors each configured to store up to a maximum common amount of user data, said sectors comprising at least one standard sector having a first total number of bits and at least one altered sector having a second total number of bits different from the first total number of bits, wherein presence of the at least one altered sector serves to authenticate the medium as an authorized copy during subsequent readback of the medium.

2. The method of claim 1, wherein the second total number of bits of the providing step is greater than the first total number of bits so that the at least one altered sector is larger than the at least one standard sector.

3. The method of claim 1, further comprising steps of reading the medium, determining an elapsed time required to read a sequence of sectors including the at least one altered sector, and verifying the medium as an authorized copy in relation to the elapsed time.

4. The method of claim 1, wherein the medium comprises an optical disc.

5. The method of claim 1, wherein the medium provides a user data channel and a control channel during readback by a readback system, and wherein the at least one altered sector induces skew between addresses in the main channel data and addresses in the control channel data.

6. The method of claim 5, and wherein the method further comprises verifying the medium as an authorized copy in relation to said skew.

7. The method of claim 5, further comprising a step of storing a table of contents in the control channel data based on the addresses of the control channel data so that computed lengths of tracks in the main channel data will be shorter than actual lengths of said tracks.

8. The method of claim 5, further comprising utilizing changes in the skew to encode an authentication data payload and wherein the verifying step further comprises using said data payload to verify the medium as an authorized copy.

9. A method for authenticating a data storage medium of the type in which user data are nominally stored in a plurality of addressable sectors each having a defined sector size containing a first total number of bits to facilitate storage of up to a maximum common amount of user data in said sector, the method comprising:

forming on the medium a number of expanded sectors each having an expanded sector size larger than the defined sector size so that each expanded sector has a second total number of bits greater than the first total number of bits; and using the number of expanded sectors to verify the medium as an authorized copy.

10. The method of claim 9, wherein the using step comprises determining an elapsed time required to read the expanded sectors and verifying the medium as an authorized copy in relation to the elapsed time.

11. The method of claim 10, wherein the user step further comprises determining a second elapsed time required to read additional sectors on the medium having the defined sector size and further using the second elapsed time to verify the medium as an authorized copy.

12. The method of claim 9, wherein each sector is composed of a number of consecutive frames and wherein the additional data are inserted into at least selected frames of each expanded sector.

13. The method of claim 9, wherein each of the plurality of sectors on the medium comprises a synchronization field which stores a synchronization pattern for use by a readback circuit to detect each said plurality of sectors, and wherein the forming step comprises providing each of the expanded sectors with an additional synchronization field which stores at least a portion of said synchronization pattern.

14. The method of claim 9, wherein the medium provides a user data channel and a control channel during readback by a readback system, and wherein the additional data provided dung the inserting step comprises control data in the control channel.

15. The method of claim 9, wherein the medium comprises a compact disc (CD).

16. The method of claim 9, wherein the medium comprises a digital versatile disc (DVD).

17. The method of claim 9, wherein the medium provides a user data channel and a control channel during readback by a readback system, wherein the inserted data induces skew between addresses in the main channel data and the control channel data, and wherein the using step comprises verifying the medium as an authorized copy in relation to said skew.

18. The method of claim 9, further comprising utilizing changes in the skew to encode an authentication data payload and wherein the using step further comprises using said data payload to verify the medium as an authentic copy.

19. An optical disc formatted in accordance with the method of claim 9.

20. A data storage medium on which a plurality of addressable sectors are formed each configured to store up to a maximum common amount of user data, said sectors comprising at least one standard sector having a first total number of bits and at least one altered sector having a second total number of bits different from the first total number of bits, the at least one altered sector identifying the medium as an authorized copy.

21. The medium of claim 20, wherein the second total number of bits is greater than the first total number of bits so that each of the at least one altered sectors is larger than each of the at least one standard sectors.

22. The medium of claim 20, wherein the medium comprises an optical disc.

23. The medium of claim 20, wherein the medium provides a user data channel and a control channel during readback by a readback system, and wherein the at least one altered sector induces skew between addresses in the main channel data and addresses in the control channel data.

24. The medium of claim 23, further comprising a table of contents stored in the control channel data based on the addresses of the control channel data so that computed lengths of tracks in the main channel data are shorter than actual lengths of said tracks.

25. The medium of claim 23, further comprising an authentication data payload encoded on the medium in relation to said skew, the data payload configured to be accessed in order to verify the medium as an authorized copy.

26. A method for preventing unauthorized duplication of an optical disc of the type in which data are nominally stored in a plurality of sectors having a defined sector size containing a first total number of bits, the disc providing main channel data and control channel data during readback by a readback system, the method comprising:
  inserting additional data onto the medium to form a number of expanded sectors each having an expanded sector size larger than the defined sector size, the expanded sectors inducing skew between addresses in the main channel data and the control channel data; and
  storing a table of contents on the medium identifying tracks of the main channel data based on the addresses of the control channel data, so that calculated lengths of the tacks from the table of contents are shorter than the actual lengths of the tracks.

27. The method of claim 26, wherein the table of contents of the storing step causes a disc duplication system to generate an unauthorized duplicate disc on which each of the tracks are truncated in relation to a difference between the calculated lengths of the tracks from the table of contents and the actual lengths of the tracks.

28. The method of claim 26, wherein the optical disc comprises an audio compact disc (CD) on which audio data are stored.

29. An apparatus comprising a readback system configured to access a storage medium on which user data are stored in a plurality of addressable sectors each configured to store up to a maximum amount of said user data, the readback system further configured to authenticate the storage medium as an authorized copy by detecting the presence of at least one altered sector from said plurality of sectors having a first total number of bits that is different from a second total number of bits in at least one remaining sector from said plurality of sectors.

30. The apparatus of claim 29, wherein the readback system is further configured to determine an elapsed time required to read said plurality of sectors including the at least one altered sector, and verifying the medium as an authorized copy in relation to the elapsed time.

31. The apparatus of claim 29, wherein the medium comprises an optical disc.

32. The apparatus of claim 29, wherein the medium provides a user data channel and a control channel during readback by the readback system, and wherein the at least one altered sector induces skew between addresses in the main channel data and addresses in the control channel data.

* * * * *